United States Patent
Liu et al.

(10) Patent No.: US 11,182,469 B2
(45) Date of Patent: Nov. 23, 2021

(54) APPLICATION SECURITY AUTHENTICATION METHOD, TERMINAL AND STORAGE MEDIUM

(71) Applicant: PAX COMPUTER TECHNOLOGY (SHENZHEN) CO., LTD, Guangdong (CN)

(72) Inventors: Shaohai Liu, Guangdong (CN); Wanqiang Lan, Guangdong (CN); Heyu Nie, Guangdong (CN); Jianqiang Li, Guangdong (CN)

(73) Assignee: PAX COMPUTER TECHNOLOGY (SHENZHEN) CO., LTD., Guangdon (CN)

( * ) Notice: Subject to any disclaimer, the term of this patent is extended or adjusted under 35 U.S.C. 154(b) by 337 days.

(21) Appl. No.: 16/467,122

(22) PCT Filed: Sep. 13, 2017

(86) PCT No.: PCT/CN2017/101544
§ 371 (c)(1),
(2) Date: Jun. 6, 2019

(87) PCT Pub. No.: WO2018/184353
PCT Pub. Date: Oct. 11, 2018

(65) Prior Publication Data
US 2019/0318078 A1 Oct. 17, 2019

(30) Foreign Application Priority Data

Apr. 5, 2017 (CN) .......................... 201710218666.8

(51) Int. Cl.
H04L 29/06 (2006.01)
G06F 21/44 (2013.01)
H04L 9/32 (2006.01)

(52) U.S. Cl.
CPC ............ *G06F 21/44* (2013.01); *H04L 9/3236* (2013.01); *H04L 9/3247* (2013.01); *H04L 9/3263* (2013.01)

(58) Field of Classification Search
CPC ...... G06F 21/44; H04L 9/3236; H04L 9/3247; H04L 9/3263
See application file for complete search history.

(56) References Cited

U.S. PATENT DOCUMENTS 6,701,434 B1 * 3/2004 Rohatgi ................. G06Q 40/04
380/277
6,970,960 B1 * 11/2005 Sarfati ...................... G06F 8/60
710/106

(Continued)

FOREIGN PATENT DOCUMENTS

CN 102064939 5/2011

OTHER PUBLICATIONS

Written Opinion and International Search Report of PCT/CN2017/101544 dated Jan. 12, 2018, 9 pages (English and Chinese).

*Primary Examiner* — Ghodrat Jamshidi
(74) *Attorney, Agent, or Firm* — Rankin, Hill & Clark LLP

(57) ABSTRACT

An application security authentication method, including: step 202, acquiring an application file to be downloaded and extracting signature information from the application file; step 204, acquiring public key information contained in a multilevel key hierarchy, and acquiring public key information of the currently highest priority according to a priority order of the public key information; step 206, authenticating the signature information with the acquired public key information of the currently highest priority; and step 208, allowing the application file to be downloaded if an authentication of the signature information is passed.

15 Claims, 9 Drawing Sheets

(56) References Cited

U.S. PATENT DOCUMENTS

| | | | | |
|---|---|---|---|---|
| 6,983,364 | B2* | 1/2006 | Gougeon | G06Q 20/341 |
| | | | | 713/165 |
| 9,280,337 | B2* | 3/2016 | Palaniappan | G06F 8/61 |
| 2005/0125513 | A1* | 6/2005 | Sin-Ling Lam | G06F 11/1456 |
| | | | | 709/220 |
| 2008/0307230 | A1* | 12/2008 | Kawamae | H04L 9/3247 |
| | | | | 713/176 |
| 2009/0041252 | A1* | 2/2009 | Hanna | H04L 63/12 |
| | | | | 380/278 |
| 2009/0210702 | A1* | 8/2009 | Welingkar | H04W 12/35 |
| | | | | 713/156 |
| 2010/0005291 | A1* | 1/2010 | Hulten | G06F 21/51 |
| | | | | 713/156 |
| 2010/0174608 | A1* | 7/2010 | Harkness | H04L 63/12 |
| | | | | 705/14.53 |
| 2016/0352522 | A1* | 12/2016 | Yi | G06F 21/51 |
| 2017/0060497 | A1* | 3/2017 | Maezawa | G06K 15/005 |
| 2017/0109533 | A1* | 4/2017 | Shah | G06F 21/575 |
| 2017/0300708 | A1* | 10/2017 | Gopshtein | G06F 21/31 |
| 2018/0183592 | A1* | 6/2018 | Campagna | H04L 9/30 |

* cited by examiner

APPLICATION SECURITY AUTHENTICATION METHOD, TERMINAL AND STORAGE MEDIUM

CROSS-REFERENCE OF RELATED APPLICATION

This present disclosure claims priority to Chinese Patent Present disclosure No. 201710218666.8, filed with China National Intellectual Property Administration on Apr. 5, 2017, and titled "Application Security Authentication Method and Device, Computer Equipment and Storage Medium", the content of which is incorporated herein by reference in its entirety.

TECHNICAL FIELD

The present disclosure relates to the field of processing of terminals, and more particularly to an application security authentication method, a terminal and a storage medium.

BACKGROUND

The POS terminal serves as a payment device, so that the safety of the POS terminal is particularly important, besides, the development of third-party payment in China is faster and faster, the competition is fierce increasingly, an event that the client's application is illegally deleted and the illegal person's application is installed instead occurs in the market, which causes the interests of the client to be damaged. In order to ensure the security of an application on the POS terminal, the traditional method is to use a private key to perform signature on the application and then store the corresponding public key in the POS terminal, such that the public key may be used to perform a signature authentication on the application and the application which has been successfully authenticated may only be downloaded into the POS terminal to be performed, when the application is downloaded. However, once the public key stored in the POS terminal is determined, the public key would not be modified, which is disadvantageous for the client to develop its own next-level client, because every client expects that it is only possible to install the application authorized by itself in the purchased POS terminal; thus, the safety authentication of the POS terminal is too rigescent currently, and the flexibility and the convenience of business requirement are not met.

SUMMARY

According to the various embodiments of the present disclosure, an application security authentication method, a terminal and a storage medium are provided.

An application security authentication method, including steps of:

acquiring an application file to be downloaded and extracting signature information in the application file;

acquiring public key information contained in a multilevel key hierarchy and acquiring public key information of the currently highest priority according to a priority order of the public key information;

authenticating the signature information with the acquired public key information of the currently highest priority; and allowing the application file to be downloaded if an authentication of the signature information is passed.

A terminal, including a memory and a processor, the memory stores a computer readable instruction, when the computer readable instruction is executed by the processor, the processor is caused to perform following steps of:

acquiring an application file to be downloaded and extracting signature information in the application file;

acquiring public key information contained in a multilevel key hierarchy, and acquiring public key information of the currently highest priority according to a priority order of the public key information;

authenticating the signature information with the acquired public key information of the currently highest priority; and allowing the application file to be downloaded if an authentication of the signature information is passed.

One or a plurality of non-volatile computer readable storage medium storing a computer executable instruction, when the computer executable instruction is executed by one or a plurality of processors, the one or a plurality of processors are caused to perform following steps of:

acquiring an application file to be downloaded and extracting signature information in the application file;

acquiring public key information contained in a multilevel key hierarchy, and acquiring public key information of the currently highest priority according to a priority order of the public key information;

authenticating the signature information with the acquired public key information of the currently highest priority; and allowing the application file to be downloaded if an authentication of the signature information is passed.

The details of one or more embodiments in the present disclosure are proposed in the following accompanying figures and descriptions. Other technical features, objectives and advantages in the present disclosure will become obvious from the description, the accompanying figures and the claims.

BRIEF DESCRIPTION OF THE DRAWINGS

In order to describe the embodiments of the present disclosure or the technical solutions in the prior art more clearly, a brief introduction regarding the accompanying drawings that need to be used for describing the embodiments of the present disclosure or the prior art is given below; it is obvious that the accompanying drawings described as follows are only some embodiments of the present disclosure, for the person of ordinary skill in the art, other drawings may also be acquired according to the current drawings on the premise of paying no creative labor.

DESCRIPTION OF THE EMBODIMENTS

In order to make the objective, the technical solution and the advantages of the present disclosure be clearer and more understandable, the present disclosure will be further described in detail below with reference to accompanying figures and embodiments. It should be understood that the specific embodiments described herein are merely intended to illustrate but not to limit the present disclosure.

Figure 1:
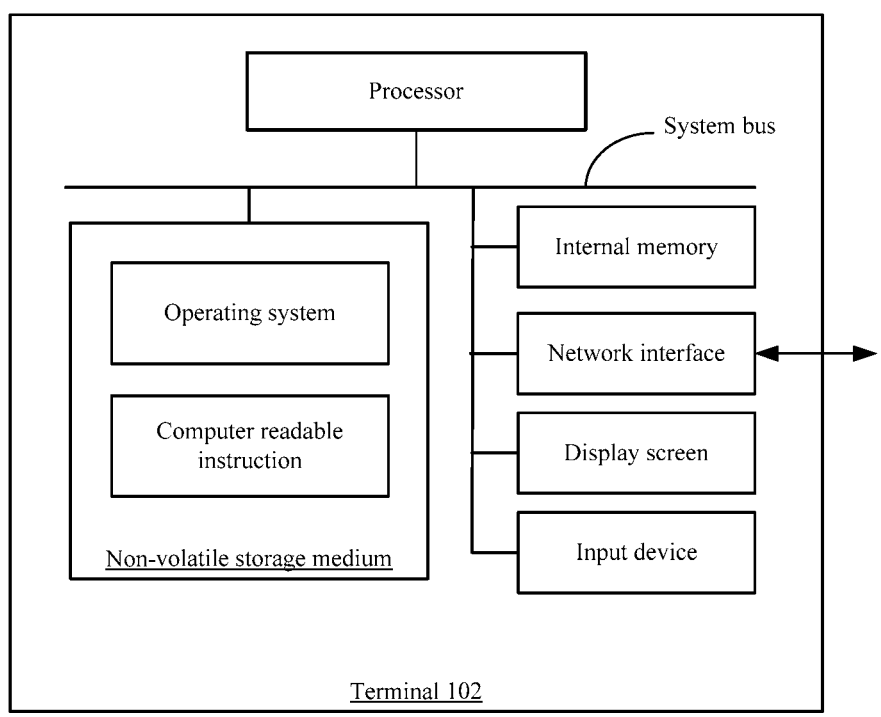
FIG. 1 depicts a block diagram of an interior of a terminal in one embodiment.

As shown in FIG. 1, in one embodiment, an internal structure of the terminal 102 is shown in FIG. 1, the terminal 102 includes a processor, an internal memory, a non-volatile storage medium, a network interface, a display screen and an input device, which are connected through a system bus. The non-volatile storage medium of the terminal 102 stores an operating system and a computer readable instruction, the computer readable instructions may be executed by the processor to implement an application security authentication method suitable for the terminal 102. The processor is configured to provide calculation and control capability and support the operation of the whole terminal. A computer readable instruction is stored in the internal memory of the terminal, when the computer readable instruction is executed by the processor, the processor may be caused to perform an application security authentication method. The network interface is configured to be connected to the network to perform the communication. The display screen of the terminal 102 may be a liquid crystal display screen or an electronic ink display screen, the input device may be a touch layer covered on the display screen and may also be a key arranged on the outer shell of an electronic equipment, a track ball or a touch control panel, and may also be an external keyboard, a touch control panel, a mouse, and the like. The terminal may be a POS (Point of Sale) machine, a smart phone, a notebook computer, a desktop computer and the like. The person of ordinary skill in the art may understand that the structure shown in FIG. 1 is merely the structural block diagram of the part associated with the technical solution of the present disclosure, which doesn't be constituted as the limitation to the terminal which the technical solution of the present disclosure is applied on. Specifically, the terminal may include more or less components than the components shown in FIG. 1, or combine certain components or have different component arrangement.

Figure 2:
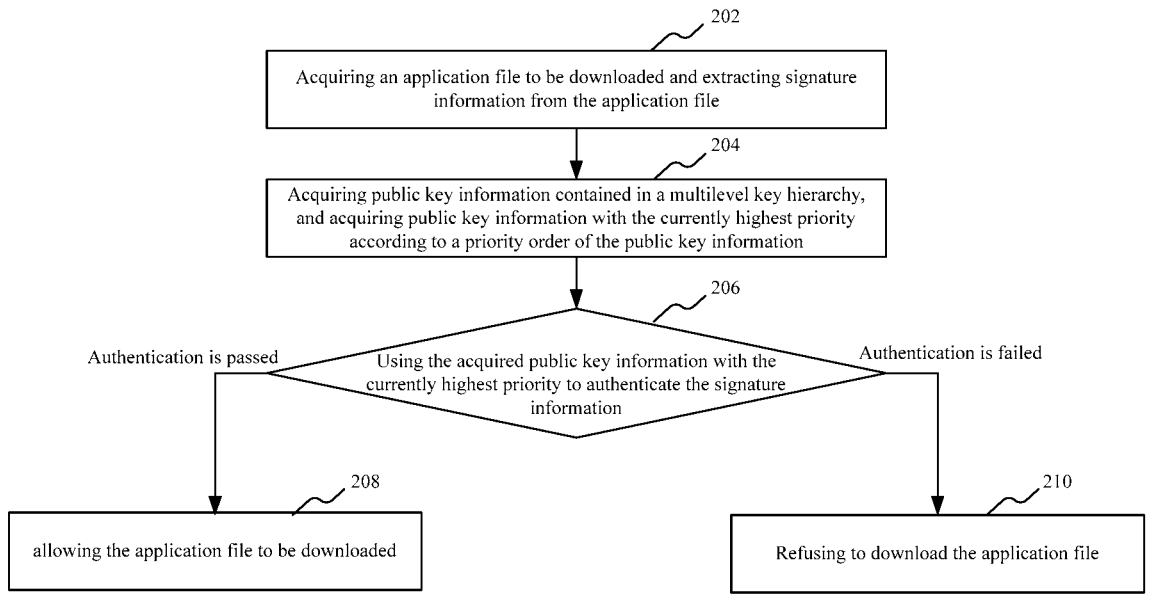
FIG. 2 depicts a flow diagram of an application security authentication method in one embodiment.

As shown in FIG. 2, in one embodiment, an application security authentication method is provided, the application security authentication method in a POS terminal is taken as an example, this method includes the following steps:

Step 202, acquiring an application file to be downloaded and extracting signature information in the application file.

In this embodiment, the POS terminal is a payment device, the security of the POS terminal is particularly important, for the security of the POS terminal, the legality of the application to be downloaded needs to be authenticated before the application is downloaded, an application file which has been authorized is merely allowed to be downloaded and installed. The application file refers to a file required to be downloaded for installing the application. In order to mark an application file authorized by the user, an encryption algorithm needs to be adopted to encrypt the application file authorized by the user. A widely used encryption algorithm is an asymmetric encryption algorithm, and the asymmetric encryption algorithm includes a PUK (Public Key) and a PVK (Private Key), where the public key and the private key are in pair; for example, the content encrypted by the private key may only be decrypted by using a corresponding public key, similarly, if the content is encrypted by the public key, the encrypted content may only be decrypted by using the corresponding private key.

In one embodiment, in order to ensure that the downloaded application file is authorized by the user, firstly, the user needs to encrypt the application file using the user's own private key, that is, the application file is signed, and then the corresponding public key is stored in the terminal. When the terminal downloads the application file, the signature information in the application file is extracted, the public key in the POS terminal is adopted to perform a signature authentication on the application file, if the signature authentication on the application file is successful, it is indicated that the application file is encrypted using a corresponding private key previously, that is, the application file is authorized by the user.

Step 204, acquiring public key information contained in the multilevel key hierarchy, and acquiring public key information of the currently highest priority according to a priority order of the public key information.

In this embodiment, in order to flexibly switch the public key for signature authentication, by arranging a multilevel key hierarchy in the terminal, much public key information may be stored in the multilevel key hierarchy simultaneously, however, different public key information has different priorities, the public key information of the currently highest priority may be used to authenticate the signature information in the application file, that is, the application file which has been successfully authenticated by the public key of the currently highest priority may be downloaded merely.

Figure 3:
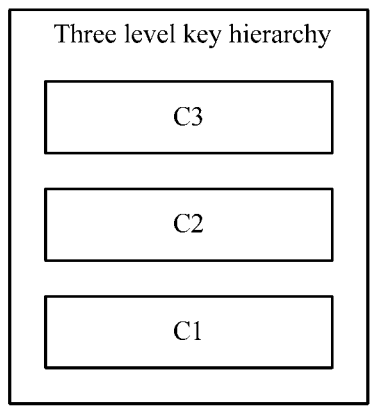
FIG. 3 depicts a schematic diagram of a three-hierarchy key hierarchy in one embodiment.

As shown in FIG. 3, in one embodiment, a schematic diagram of a three-level key hierarchy is depicted, where the three-hierarchy key hierarchy includes three storage units of C1, C2 and C3, which are used for storing different public key information respectively, where the priority corresponding to C3 is the highest, the priority corresponding to C2 is secondary, and the priority corresponding to C1 is the lowest, the public key information of the highest level may only authenticate the signature information of the application file if the three-level key hierarchy includes two or more than two public key information. For example, the storage unit C1 and storage unit C2 store public key information simultaneously, the POS terminal uses a PUK (public key) stored by the storage unit C2 to authenticate the signature information in the application file. If public key information exists in the storage unit C1, the storage unit C2 and the storage unit C3 simultaneously, the public key information in the storage unit C3 is used to authenticate the signature information in the application file, of course, if the public key information only exists in the storage unit C1, the public key information of the storage unit C1 is used to authenticate the signature information of the application file. Where the storage unit of the public key information is determined according to the sequence of downloading of the public key; for example, if the first public key information is the one downloaded into the multilevel key hierarchy firstly, the first public key information is stored in the storage unit C1, if the second public key information is downloaded afterwards, the second public key information is stored in the storage unit C2 orderly, and so on.

In one embodiment, after a client A purchases a POS terminal from a merchant, a private key of the merchant is used to sign on a public key of the client A, and then the public key of the client is downloaded into the POS terminal; at this moment, the effective public key in the POS terminal is switched from the public key of the merchant to the public key of the client A. Why the private key of the merchant is used to sign on the public key of the client A firstly is for the reason of preventing a client who hasn't been authorized by the merchant from downloading its own public key into the POS machine. Where the public key of the merchant is pre-stored in the POS machine, when the public key of the client A is downloaded, a public key of the merchant is used to perform signature authentication on the public key of the client A, if the authentication is passed, it is indicated that the client A is the client authorized by the merchant, and the public key of the client A is allowed to be downloaded; after downloading of the public key of the client A is successful, the public key of the client A is the public key of the currently highest priority, the application file authorized by the client A is only allowed to be downloaded into the POS terminal. When the client A needs to develop its own next-level agent client B, the private key of the client A is used to sign on the public key of the next-level proxy client B, and then the public key of the next-level proxy client B is downloaded into the POS terminal; similarly, after the downloading of the public key of the next-level proxy client B is successful, the public key of the client B becomes the public key of the currently highest priority, and the application authorized by the client B is only allowed to be downloaded into the POS terminal.

Step 206, authenticating the signature information with the acquired public key information of the currently highest priority, if an authentication of the signature information is passed, step 208 is performed, if the authentication of the signature information is failed, the step 210 is performed.

In this embodiment, when the POS terminal acquires the public key information with the highest priority, the public key information is used to authenticate the signature information contained in the application file, if the authentication of the signature information is passed, it is indicated that the application file is legitimate, and the application file is allowed to be downloaded. If the authentication of the signature information is failed, the application file is not allowed to be downloaded.

Step 208, allowing the application file to be downloaded.

In this embodiment, when the signature information in the application file is verified successfully by using the public key of the currently highest priority, when the signature information in the application file is successfully verified, it is indicated that the application file is signed by using corresponding private key information, it is further indicated that the application file is an authorized and legitimate application file, at this time, the application file is allowed to be downloaded, and a corresponding application is installed in the terminal according to the downloaded application file.

Step 210, refusing to download the application file.

In this embodiment, when the signature information in the application file is authenticated using the public key of the currently highest priority fails, it is indicated that the application file is illegal, in order to guarantee the security of the terminal, the application file is not allowed to be downloaded.

In one embodiment, when the signature information in the application file is not acquired, it is indicated that the application file hasn't been encrypted correspondingly, the application file belongs to an illegal application, and downloading of the application file is directly refused.

In this embodiment, a multilevel key hierarchy is arranged in the POS terminal, much public key information may be stored in the multilevel key hierarchy at the same time, however, when the signature information in the application file is verified, the public key information of the currently highest priority may only be used for authenticating the signature information. When a client wants to develop its own next-level agent, it only needs to download the public key of the next-level agent into the hierarchy with higher priority in the POS terminal, in this way, the effective public key information in the POS terminal becomes the public key information of the next-level agent, at this time, the application authorized by the next-level agent may only be downloaded. This method is not only beneficial to protect the security of the POS terminal application, but also beneficial for the client to develop its own next-level client by dynamically switching the effective public key information in the terminal; as compared to the traditional formalist mode, the method may meet the flexibility and the convenience of service requirements better.

Figure 4:
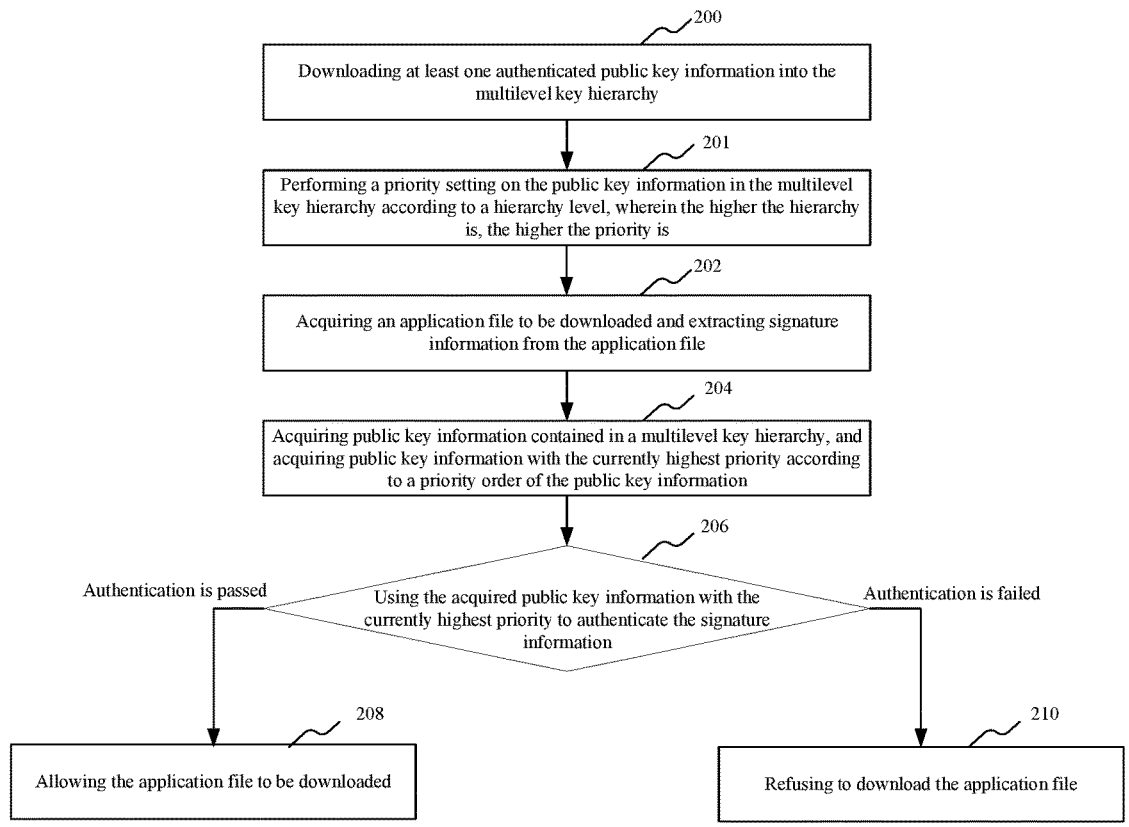
FIG. 4 depicts a flow diagram of an application security authentication method in another embodiment.

As shown in FIG. 4, in one embodiment, before the step of acquiring the application file to be downloaded and extracting the signature information in the application file, the method further comprises the following steps of:

Step 200, downloading the at least one verified public key information into the multilevel key hierarchy.

In this embodiment, firstly, the POS terminal needs to download public key information into a multilevel key hierarchy, when the public key information is downloaded into the multilevel key hierarchy, the public key information needs to be signed and authenticated. In one embodiment, unified root public key information may be used to authenticate the downloaded public key information.

In order to further guarantee the safety of the public key information, in another embodiment, the public key information of the up one level is used to authenticate the public key information to be downloaded, if authentication of the public key information is successful, it is indicated that the public key information is legitimate, and the public key information is allowed to be downloaded into the multilevel key hierarchy. Specifically, when the POS terminal leaves factory, a root public key is embedded in the POS terminal, when the public key information is downloaded into the multilevel key hierarchy for the first time (for the convenience of distinguishing, the public key information which is successfully downloaded firstly is called "the first public key information", the public key information which is successfully downloaded secondly is called "the second public key information", and the like), the root public key information in the system needs to be used to perform signature authentication on the first public key information, when the second public key information is downloaded into the multilevel key hierarchy, the first public key information needs to be used to perform signature authentication on the second public key information, and the like. Where the public key information and the private key information are in pair, for example, the root public key and the root private key are in pair, the first public key and the first private key are in pair, and the second public key and the second private key are in pair, and the like. Therefore, why the signature authentication of the public key information may be performed successfully using the root public key is for the reason that the public key information has been previously encrypted by the root private key, similarly, why the signature authentication of the public key information may be performed successfully using the first public key is because that the public key information has been previously encrypted by the first private key, and the like.

Therefore, In the aforesaid embodiment, before at least one public key information is downloaded into the multilevel key hierarchy, firstly, the root private key information needs to be used to encrypt the first public key information, then, if the second public key information needs to be further downloaded, the second public key information needs to be encrypted by using the first private key information, and the like. Specifically, the first public key information signed by the root private key information is downloaded into the first level in the multilevel key hierarchy; the second public key information signed by the first private key information is downloaded into the second level in the multilevel key hierarchy; the third public key signed by the second private key information is downloaded into the third level in the multilevel key hierarchy, and the like. It needs to be further noted that the private key and the public key are mutually in pair, where the root private key information and the root public key information are in pair, the first private key information and the first public key information are in pair, the second private key information and the second public key information are in pair, the third public key information and the third public key information are in pair, and the like.

Step 201, performing a priority setting on the public key information in the multilevel key hierarchy according to the level of hierarchy, where the higher the hierarchy is, the higher the priority is.

In this embodiment, in order to dynamically switch the public key information, the priority order of the public key information needs to be set in the multilevel key hierarchy, the public key information with the highest priority is merely effective and may authenticate the signature information of the application file. Specifically, priority setting is performed on the public key information in the multilevel key hierarchy according to the level of hierarchy, the higher the hierarchy is, the higher the priority is. Where the setting of the hierarchy is determined according to the sequence of downloading of the public key information, the downloaded first public key information is stored in the first level, the downloaded second public key information is stored in the second level, the downloaded third public key information is stored in the third level, and the like. Such setting is beneficial for the client to develop its own next-level proxy client. The latest downloaded public key information is of course the public key information owned by the latest client, and thus the priority of the latest downloaded public key information is the highest, at this time, the application file authorized by the latest client is only allowed to be downloaded, so that the flexibility and the convenience in business operation are met.

Figure 5:
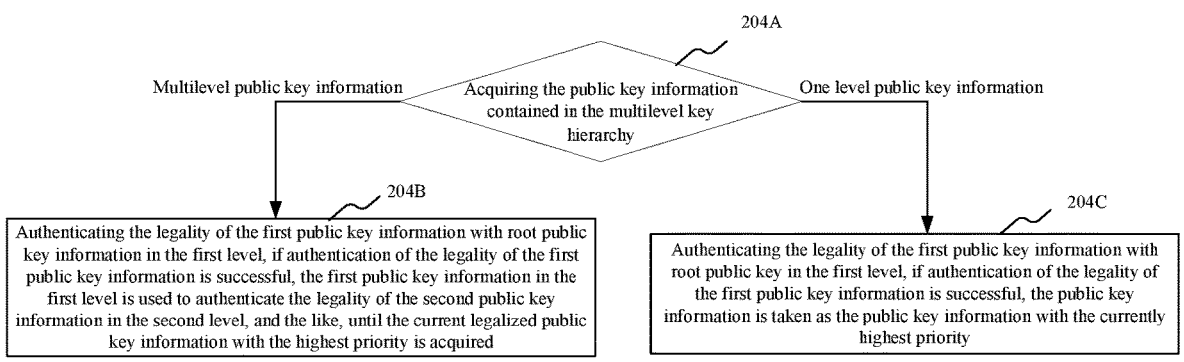
FIG. 5 depicts a flow diagram of a method of acquiring public key information in a multilevel key hierarchy and acquiring the public key information of the currently highest priority according to a priority order of the public key information in one embodiment.

As shown in FIG. 5, in one embodiment, the public key information contained in the multilevel key hierarchy is acquired, the step 204 of acquiring the public key information of the currently highest priority according to the priority order of the public key information includes:

Step 204A, acquiring the public key information contained in the multilevel key hierarchy, and performing step 204B if multilevel public key information is included in the multilevel key hierarchy, or performing step 204C if single level of public key information is included in the multilevel key hierarchy.

In this embodiment, in order to prevent a lawbreaker from modifying the public key information with the highest priority in the POS terminal and then downloading illegal application file, thereby causing the interests of the client to be damaged. When the application file is downloaded, the legality of each level of public key information needs to be authenticated from front to back. Since each level of public key information is encrypted using the private key in the up one level, thus, when downloading or start-up is performed, the public key information in the up one level may be used to authenticate the public key in the next level. Firstly, public key information stored in the multilevel key hierarchy is acquired, when two or more than two public key information is contained in the multilevel key hierarchy, the root public key information needs to be used to authenticate the legality of the first public key information in the first level, if authentication of the legality of the first public key information is successful, the first public key information in the first layer continues to be used to authenticate the legality of the second public key information in the second level, and the like, until the current legitimate public key information with the highest priority is acquired. When there is only one public key information in the multilevel key hierarchy, it only needs to use the root public key information stored in the POS terminal to authenticate the first public key information in the first level, if authentication of the first public key information in the first level is successful, the first public key information is the public key information of the currently highest priority, and the first public key information is directly used to authenticate the signature information in the application file.

Step 204B, using the root public key information to authenticate the legality of the public key information in the first level, and using the first public key information in the first level to authenticate the legality of the second public key information in the second level if the authentication of the legality of the public key information in the first level is successful, and the like, until the current legitimate public key information with the highest priority is acquired. Specifically, the root public key information is acquired as the current public key information, and the current public key information is used to authenticate the legality of the public key information in the up one level, if an authentication of the legality of the public key information in the up one level is successful, the successfully authenticated public key information in the up one level is used as the current public key information, and the step of using the current public key information to authenticate the public key information in the up one level is performed, until the current legitimate public key information with the highest priority is acquired, where the higher the hierarchy is, the higher the priority is. In one embodiment, the root public key information is embedded in the terminal instead of the multilevel key hierarchy. When much public key information is contained in the multilevel key hierarchy, firstly, the root public key is used to authenticate the legality of the first public key information in the first level in the multilevel key hierarchy, if an authentication of the legality of the first public key information is failed, it is indicated that the public key information in the terminal may have been modified by the lawbreaker, so that the application file may be refused to be downloaded directly. If the authentication of the legality of the first public key information is successful, then, the first public key information in the first level is used to authenticate the legality of the second public key information in the second level, and the like, until the current legitimate public key information with the highest priority is acquired. If the second public key information is already the public key information of the currently highest priority, the second public key information is directly used to authenticate the signature information in the application file subsequently. If public key information of a higher hierarchy still exists, the second public key information is continued to be used to authenticate the legality of the public key information in the third level, and the like;

Step 204C, using the root public key to authenticate the legality of the first public key information in the first level, and taking the public key information as the public key information of the currently highest priority if authentication of the legality of the first public key information is successful.

In this embodiment, when there is only one public key information in the multilevel key hierarchy, the root public key is directly used to authenticate the legality of the first public key information in the first level, if authentication of the legality of the first public key information is successful, the public key information is used as the public key information of the currently highest priority, if the authentication of the legality of the first public key information is failed, it is indicated that the public key information has been tampered, and a downloading of the application file is directly refused.

In one embodiment, a three-level multilevel key hierarchy is taken as an example (see FIG. 3), where the conversion relation of each level of public key state in the three-level key hierarchy is described as follows: firstly, the first layer public key, that is, the public key stored in the storage unit C1 has three states, one state is that there is no public key, another state is that the public key is from a manufacturer, another state is that the public key is from the client 1. The storage unit C1 is initially in a state without the public key, after the POS is sold to the client 1, if the client 1 does not have its own public key temporarily, the public key of the manufacturer encrypted by the root public key may be downloaded firstly, and the public key state of the storage unit C1 is converted into the manufacture's own public key, and then the public key of the client 1 encrypted by the root public key is downloaded when the subsequent client 1 has its own public key subsequently, at this time, the public key state of the storage unit C1 is converted into the public key of the client 1. Of course, if the client 1 has its own public key initially, the public key of the client 1 encrypted by the root public key may be directly downloaded, the public key state of the storage unit C1 may be directly converted from the state without the public key into the state of the public key of the client 1. There are two public key states of the storage unit C2, one state is that there is no public key, another state is that the public key is the public key of the client 2. When public key is not downloaded into the storage unit C2, the public key state of the storage unit C2 is the state without public key, when the public key of the client 2 signed by the private key of the client 1 is downloaded, the public key state of the storage unit C2 is converted from the state without the public key into the public key state of the client 2. There are also two public key states of the storage unit C3, one state is the state without the public key, another state is the public key of the client 3. The public key state of the storage unit C3 may be converted from the state without the public key into the public key of the client 3 by downloading the public key of the client 3 signed by the private key of the client 2. When the public key of the currently highest priority of the POS terminal is the public key of the client 1 or the public key of the client 2 or the public key of the client 3, it is called a terminal locking state.

In this case, the application signed by the client's own private key is allowed to be downloaded merely, so that the safety of client machine is effectively protected. In addition, when it is in the public key state of the client 1, the client 1 has the right to determine whether its own machine should be authorized to the next-level client 2 to be used; similarly, the client 2 also has the right to determine whether its own machine should be authorized to the next-level client 3 to be used, thus, a flexibility in use is effectively guaranteed.

In one embodiment, a schematic diagram of a signature format of a PUK (Public Key) is shown in table 1. Where the row of signature is 256 bytes data generated by encryption using a private key; SIGNATURE LENGTH identifies the length of encryption of the private key; PUBLIC KEY INDEX refers to the index of the public key and is used for identifying which public/private key pair is currently used; RESERVE represents a reserved field; SIGNED FLAG is used for identifying which encrypted version is currently used.

TABLE 1

| PUK |
| --- |
| SIGNATURE (256 bytes) |
| SIGNATURE LENGTH |
| PUBLIC KEY INDEX |
| RESERVE |
| SIGNED FLAG |

Considering the condition that some proxy clients have purchased the POS terminal and think about returning the POS terminal back after these proxy clients' public key information is installed in the POS terminal, for this purpose, a process of authority returning is further arranged.

Figure 6:
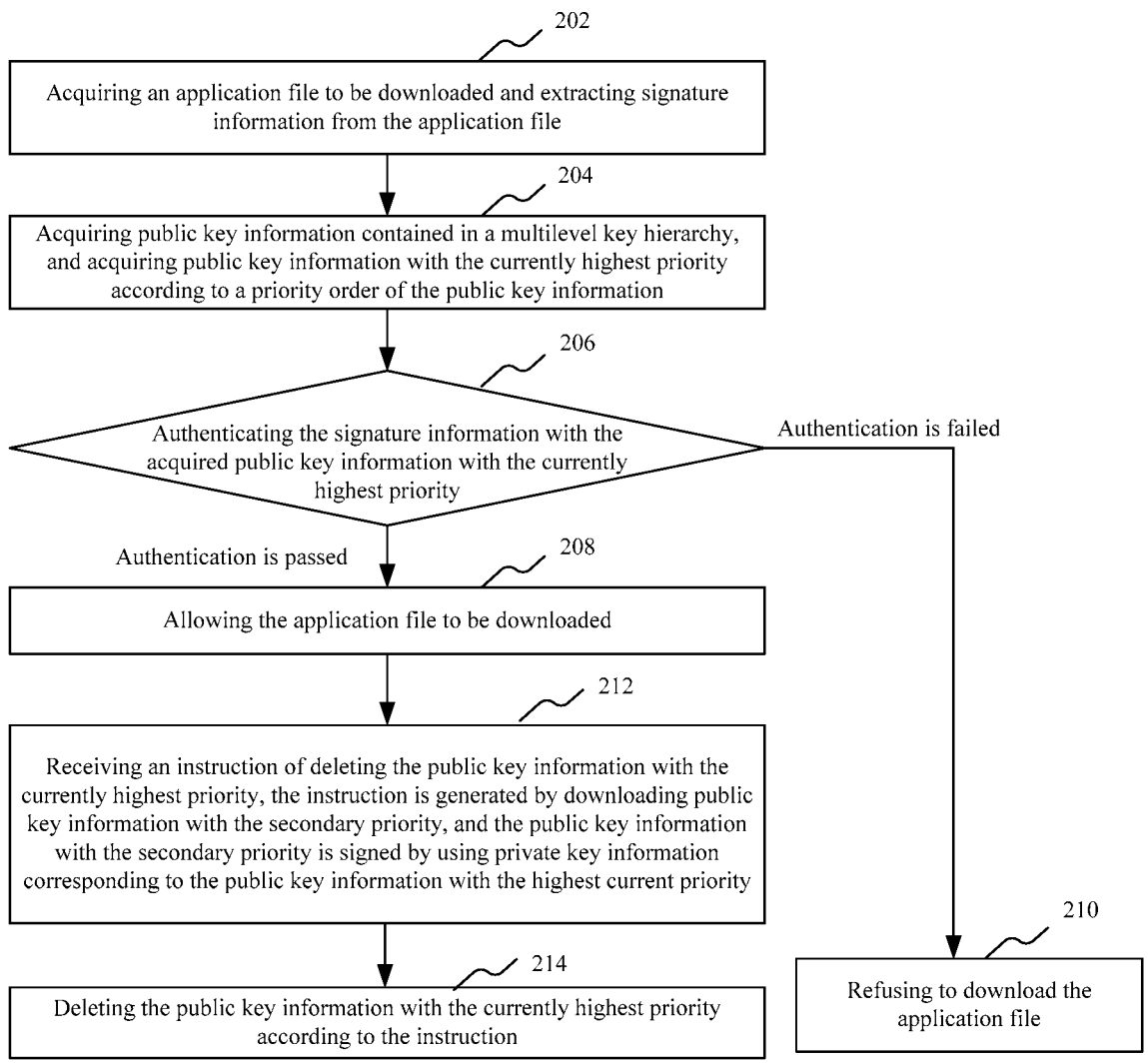
FIG. 6 depicts a flow diagram of an application security authentication method in another embodiment.

As shown in FIG. 6, in one embodiment, the application security authentication method further includes:

Step 212, receiving an instruction of deleting the public key information of the currently highest priority, where the instruction is generated by downloading the public key information with the secondary priority, and the public key information with the secondary priority is signed by using the private key information corresponding to the public key information of the currently highest priority.

Step 214, deleting the public key information of the currently highest priority according to the instruction.

In this embodiment, when the client purchases the POS terminal, and installs its own public key information in the terminal, and wants to return the POS terminal back to the up one level proxy client, the client's own public key information installed in the POS terminal needs to be deleted, and then the corresponding authority is returned to the up one level proxy client. However, in order to prevent other person from deleting the public key information in the highest level easily, the deletion instruction must be generated after authorization of the current client. The public key information of the secondary priority refers to the public key information which is second only to the current highest priority, that is, the second public key information, and more specifically, the public key information of the up one level agent client. In order to mark the deletion operation authorized by the current client, the public key information of the secondary priority is encrypted by the private key information of the current client, then, the encrypted public key information with the secondary priority is downloaded into the POS terminal, the public key information of the current client (i.e., the public key information of the currently highest priority) may performs signature authentication on the public key information of the secondary priority; if the authentication on the public key information of the secondary priority is successful, it is indicated that the public key information with the secondary priority is authorized by the current client, and the instruction of deleting the public key information of the currently highest priority is generated, and then the public key information of the current client is deleted according to the deletion instruction. For example, if the client 3 purchases the POS machine from the client 2 and installs its own public key information into the POS terminal, now, the client 3 wants to return the POS machine back to the client 2, the authority should also be returned back to the client 2 correspondingly. Since the public key information of the client 3 is the public key information of the currently highest priority, the priority of the public key information of the client 2 is secondary only to that of the client 3, thus, if the public key information of the client 3 is deleted, the public key information of the client 2 will become the public key information with the highest priority, which equates returning the authority back to the client 2. However, in order to prevent the public key information of the currently highest priority from being easily deleted by the lawbreaker, that is, if the client 3 does not return the POS machine back to the client 2, however, the public key information of the client 3 is deleted by the lawbreaker, damage of the interests of the client 3 will be caused. Therefore, if the corresponding deletion operation needs to be performed, the deletion operation must be authorized by the client 3. Specifically, the private key information of the client 3 is used to encrypt the public key information of the client 2, then, the public key information of the client 2 is downloaded, the public key information of the client 3 is used to authenticate the public key information of the client 2, if the authentication of the public key information of the client 2 is successful, it is indicated that this operation is authorized by the client 3, the instruction of deleting the public key information of the client 3 is generated correspondingly, and a deletion operation is performed correspondingly according to the instruction.

Figure 7:
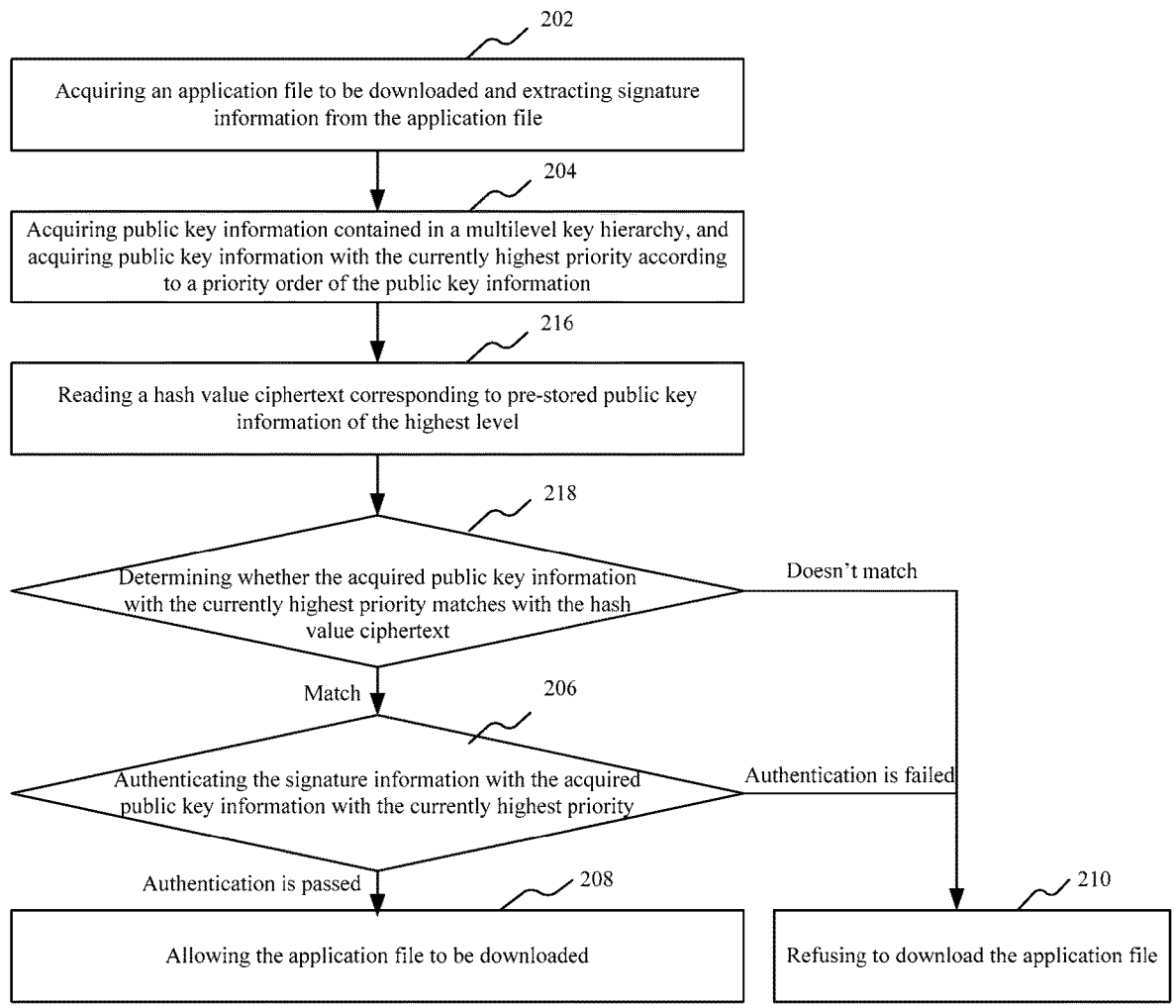
FIG. 7 depicts a flow diagram of an application security authentication method in another embodiment.

As shown in FIG. 7, in one embodiment, before authenticating the signature information with the acquired public key information of the currently highest priority, the method further includes:

Step 216, reading a hash value ciphertext corresponding to pre-stored public key information in the highest hierarchy.

Step 218, determining whether the acquired public key information of the currently highest priority matches with the hash value ciphertext; performing step 206 if the acquired public key information of the currently highest priority matches with the hash value ciphertext; or performing step 210 if the acquired public key information of the currently highest priority is inconsistent with the hash value ciphertext.

In this embodiment, in order to further improve the security of the POS terminal and prevent the lawbreaker from erasing the PUK (Public Key) information in the highest hierarchy to directly return to the public key in the upper hierarchy by directly rewriting flash data, every time when the public key information is updated, the terminal will store the hash value ciphertext of the public key information in the highest hierarchy in the system. Where, the hash value ciphertext is the ciphertext which is generated by encrypting a hash value of the public key information using an encryption algorithm, and is used for solely identifying a piece of public key information. Therefore, in order to perform further authentication on the legality of the acquired public key information of the currently highest priority, firstly, the hash value ciphertext corresponding to the pre-stored public key information of the highest-level is read, then, whether the acquired public key information of the currently highest priority matches with the hash value ciphertext is verified, that is, whether the acquired public key information of the currently highest priority is the pre-stored public key information of the highest level is determined, if it is determined that the acquired public key information of the currently highest priority is the pre-stored public key information of the highest level, it is indicated that the public key information of the highest level is not illegally deleted, the acquired public key information of the currently highest priority is allowed to be used to authenticate the signature information of the application, if it is determined that the acquired public key information of the currently highest priority is not the pre-stored public key information of the highest level, it is indicated that the public key information of the highest level has been illegally deleted, and the application file is refused to be downloaded.

There are various methods of determining whether the acquired public key information of the currently highest priority matches with the hash value ciphertext. In one embodiment, firstly, a hash algorithm is used to calculate a first hash value corresponding to the public key information of the currently highest priority, then, the hash value ciphertext corresponding to the public key information of the highest level is decrypted, a second hash value corresponding to the public key information of the highest level is acquired, and whether the acquired public key information of the currently highest priority matches with the aforesaid hash value ciphertext is determined by comparing whether the first hash value is identical to the second hash value, if the first hash value is identical to the second hash value, it is indicated that the acquired public key information of the currently highest priority matches with the aforesaid hash value ciphertext. In another embodiment, firstly, a hash algorithm is used to convert the acquired public key information of the currently highest priority into a representation form of the hash value, then, the hash value corresponding to the public key information of the currently highest priority is encrypted to generate the first hash value ciphertext, and then whether the first hash value ciphertext is identical to the hash value ciphertext corresponding to the public key information of the highest level is compared, if the first hash value ciphertext is identical to the hash value ciphertext corresponding to the public key information of the highest level, it is determined that the acquired public key information of the currently highest priority matches with the aforesaid hash value ciphertext.

Figure 8:
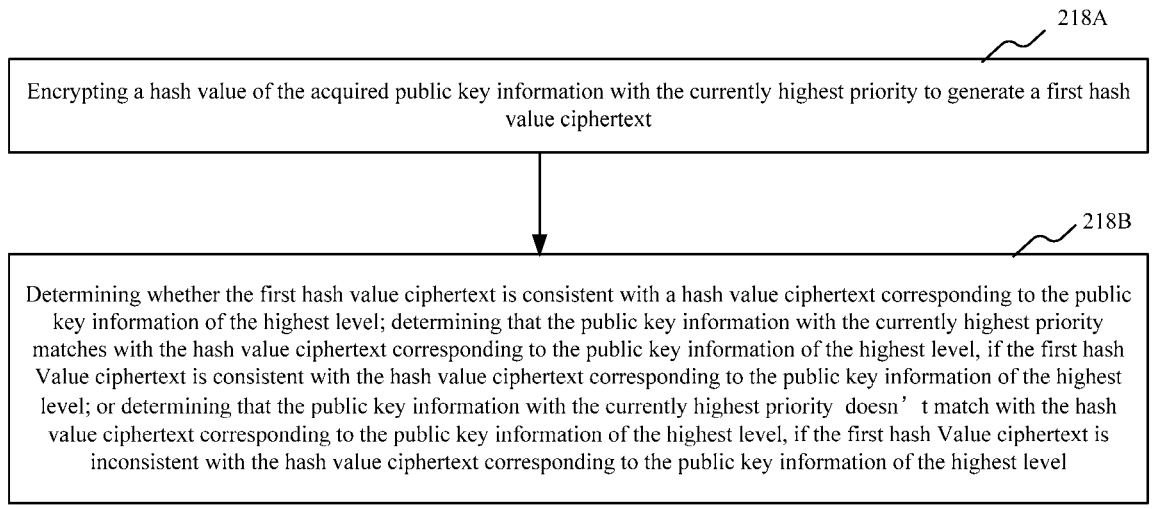
FIG. 8 depicts a flow diagram of a method of determining whether the acquired current public key information with the highest priority matches with the hash value ciphertext in one embodiment.

As shown in FIG. 8, in one embodiment, the step 218 of determining whether the acquired public key information of the currently highest priority matches with the hash value ciphertext includes:

Step 218A, encrypting the hash value of the acquired public key of the currently highest priority and generating the first hash value ciphertext.

Step 218B, determining whether the first hash value ciphertext is consistent with the first hash value ciphertext corresponding to the public key information of the highest level; and determining that the acquired public key information of the currently highest priority matches with the hash value ciphertext if the first hash value ciphertext is consistent with the first hash value ciphertext corresponding to the public key information of the highest level; or determining that the acquired public key information of the currently highest priority doesn't match with the hash value ciphertext if the first hash value ciphertext is inconsistent with the first hash value ciphertext corresponding to the public key information of the highest level.

In this embodiment, in order to determine whether the acquired public key information of the currently highest priority matches with the hash value ciphertext, the hash value of the acquired public key information of the currently highest priority needs to be encrypted to generate the first hash value ciphertext. Firstly, a hash algorithm is used to convert the acquired public key information of the currently highest priority into a representation form of the hash value, then, the hash value corresponding to the public key information of the currently highest priority is encrypted to generate the first hash value ciphertext, and then whether the first hash value ciphertext is identical to the hash value ciphertext corresponding to the public key information of the highest level is determined by comparison, if the first hash value ciphertext is identical to the hash value ciphertext corresponding to the public key information of the highest level, it is indicated that the acquired public key information of the currently highest priority is legitimate, and the public key information of the currently highest priority is allowed to be used to authenticate the signature information. If the first hash value ciphertext and the hash value ciphertext corresponding to the public key information of the highest level are different, it is indicated that the public key information is likely to be tampered by the lawbreaker, and the application file is directly refused to be downloaded.

Specifically, whenever new public key information is downloaded into the POS terminal, and 16 bytes of random number may be used as a secret key of 3DES (Triple Data Encryption Standard), and 3DES encryption algorithm is used to encrypt a hash value of the new public key information (i.e., the public key information with the highest priority) so as to generate a hash value ciphertext, and the hash value ciphertext is stored in a fixed region (e.g., the hash value ciphertext is stored in a fixed region of a nand flash); moreover, every time when the hash value ciphertext corresponding to the new public key information is written, erasion of old hash value ciphertext will be generated, and the new hash value ciphertext is stored, in this way, it may be guaranteed that the hash value ciphertext corresponding to the latest public key information may be always stored in the fixed region. The 16 bytes of random number may be stored in an OTP (One Time Programmable) region of the system, is generated when the system runs for the first time, and is written into the OTP region, where the OTP region is a one-off program writing region and is not allowed to be modified subsequently. In this way, it is beneficial to use the 16 bytes of random number to encrypt the hash value of the acquired public key information with the highest priority, the safety of the 16 bytes of random number is effectively guaranteed and the 16 bytes of random number is prevented from being tampered by storing the 16 bytes of random number in the one-off writing region.

In this embodiment, firstly, in one aspect, the public key information of the currently highest priority is acquired, then, the hash value corresponding to the public key information is calculated, and then the hash value is encrypted using the 3DES encryption algorithm, and a hash value ciphertext is generated; in another aspect, a hash value ciphertext corresponding to the stored public key information of the highest level is read, and whether the two hash value ciphertexts are identical are determined by comparison, if the two hash value ciphertexts are identical, it is indicated that the acquired public key information of the currently highest priority matches with the hash value ciphertext; if the two hash value ciphertexts are different, it is indicated that the acquired public key information of the currently highest priority doesn't match with the hash value ciphertext.

The embodiments of the present disclosure provide a terminal. An internal structure of the terminal may be corresponding to the structure shown in FIG. 1, a whole or a part of each of the modules described as follows may be implemented through software, hardware or the combination of software and hardware.

Figure 9:
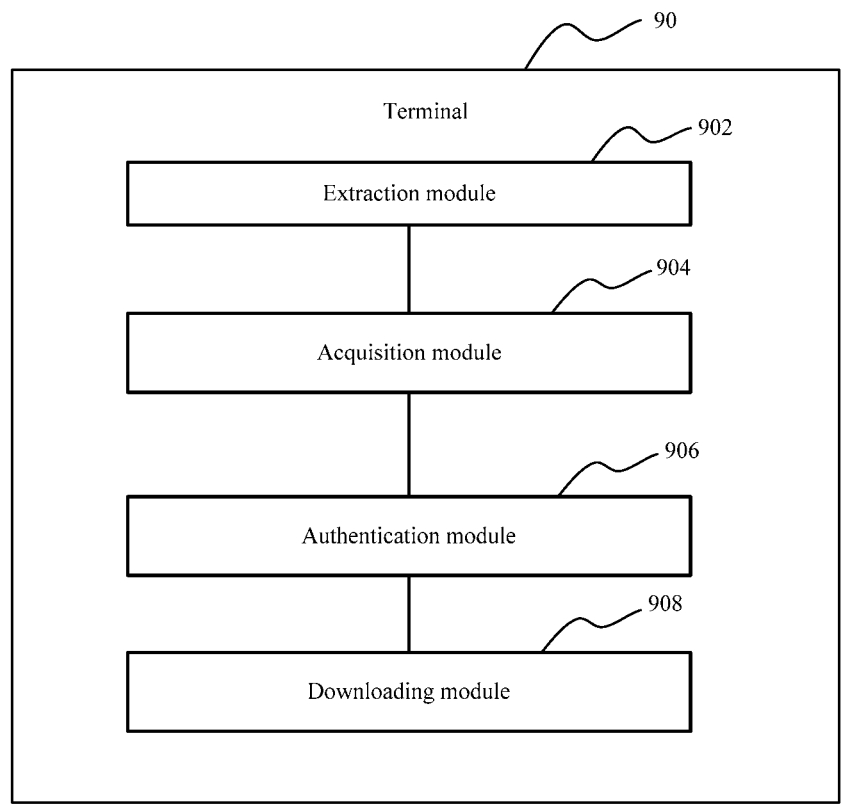
FIG. 9 depicts a block diagram of a terminal in one embodiment.

In one embodiment, as shown in FIG. 9, the terminal 90 in this embodiment includes:

an extraction module 902 configured to acquire an application file to be downloaded and extract the signature information in the application file;

an acquisition module 904 configured to acquire public key information contained in a multilevel key hierarchy, and acquire the public key information of the currently highest priority according to a priority order of the public key information;

an authentication module 906 configured to authenticate the signature information with the acquired public key information of the currently highest priority; and a downloading module 908 configured to allow the application file to be downloaded if an authentication of the signature information is passed.

Figure 10:
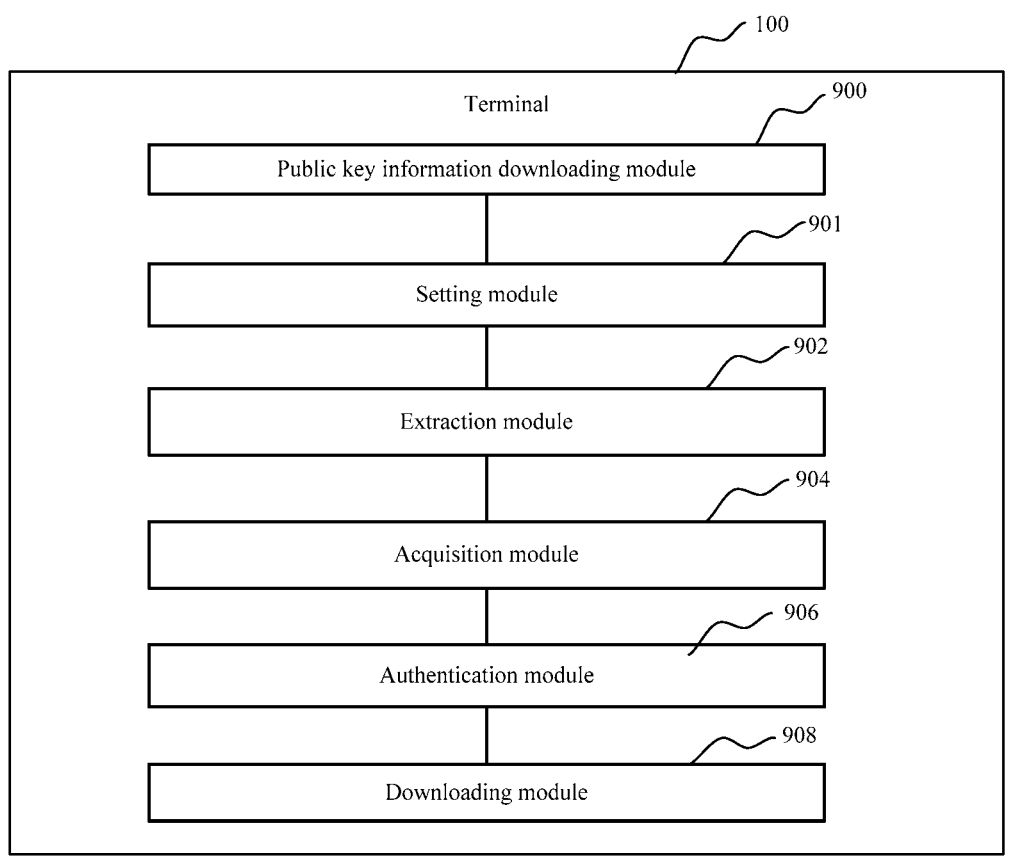
FIG. 10 depicts a block diagram of a terminal in another embodiment.

As shown in FIG. 10, in one embodiment, the terminal 100 further includes:

a public key information downloading module 900 configured to download the at least one authenticated public key information into the multilevel key hierarchy;

a setting module 901 configured to perform a priority setting on the public key in the multilevel key hierarchy according to the level of hierarchy, the higher the hierarchy is, the higher the priority is.

In one embodiment, the acquisition module 904 is further configured to acquire the public key information contained in the multilevel key hierarchy, where when multilevel public key information is included in the multilevel key hierarchy, the root public key information is used to authenticate the legality of the first public key information in the first level, if an authentication of the legality of the first public key information is successful, the first public key in the first level is used to authenticate the legality of the second public key information in the second level, and the like, until the current legitimate public key information with the highest priority is acquired.

Figure 11:
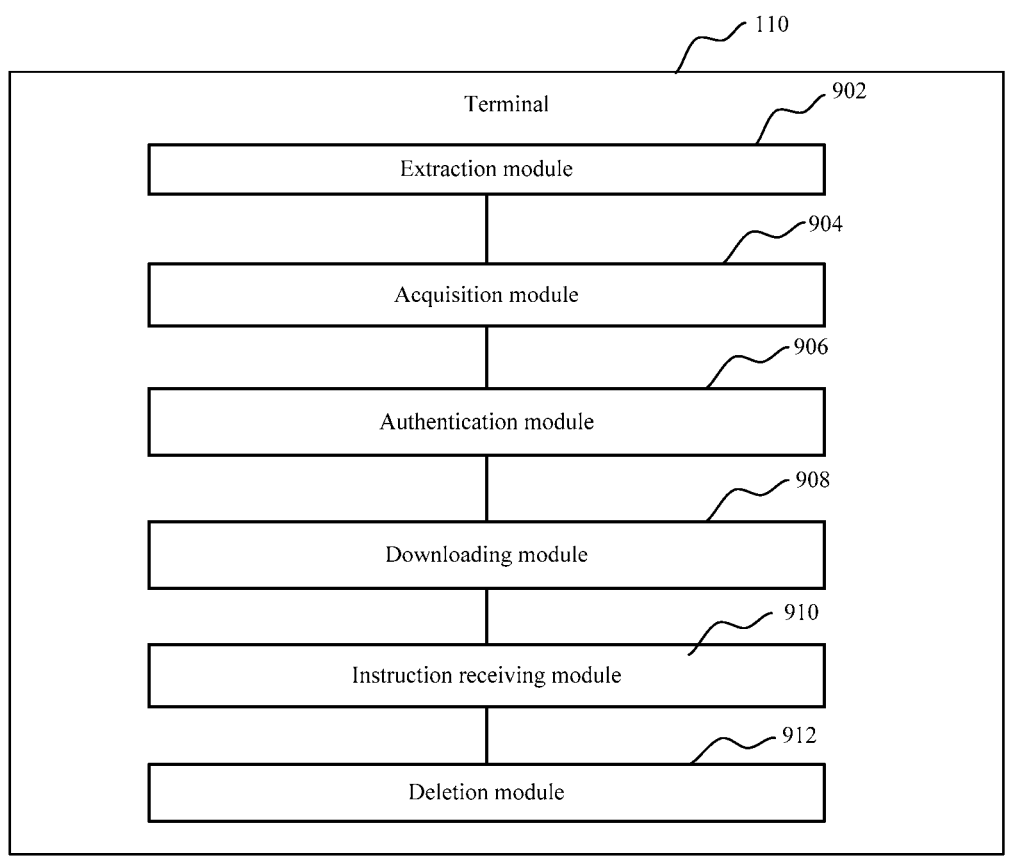
FIG. 11 depicts a block diagram of a terminal in another embodiment.

As shown in FIG. 11, in one embodiment, the terminal 110 further includes:

an instruction receiving module 910 configured to receive an instruction of deleting the public key information of the currently highest priority, where the instruction is generated by downloading the public key information with the secondary priority, and the public key information with the second priority is signed by using the private key information corresponding to the public key information of the currently highest priority;

A deletion module 912 configured to delete the public key information of the currently highest priority according to the instruction.

Figure 12:
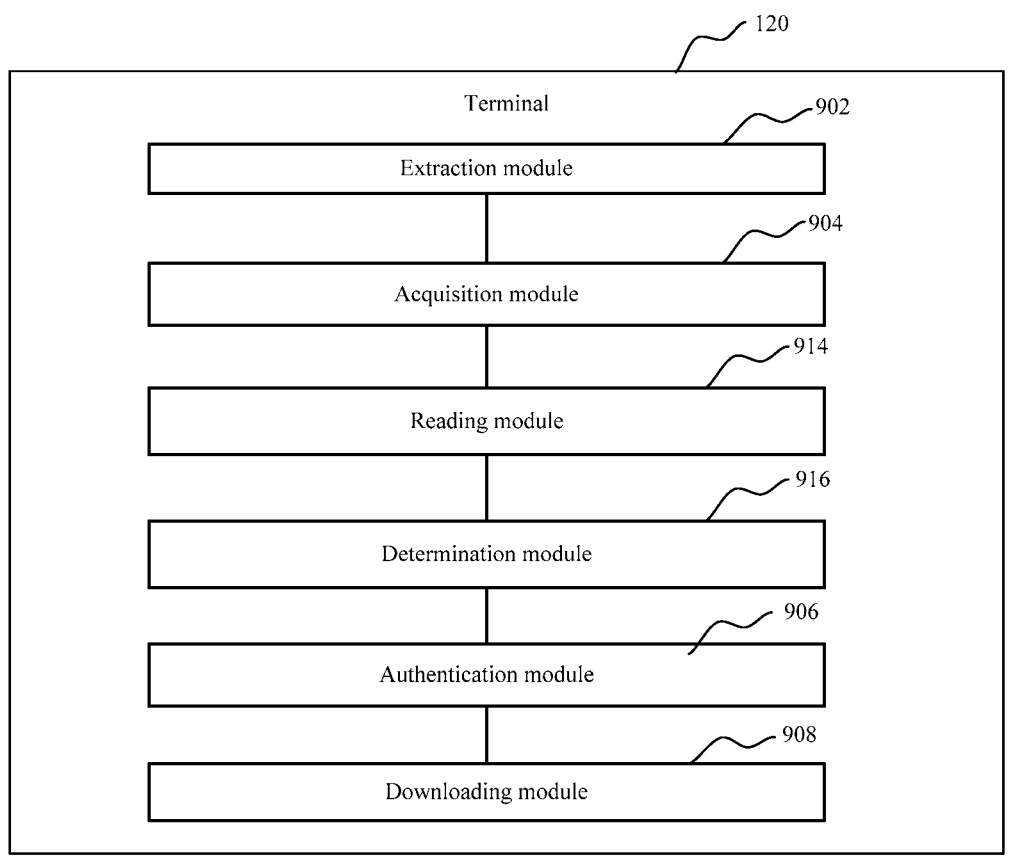
FIG. 12 depicts a block diagram of a terminal in another embodiment.

As shown in FIG. 12, in one embodiment, the terminal 120 further includes:

a reading module 914 configured to read a hash value ciphertext corresponding to the pre-stored public key information of the highest level;

a judgment module 916 configured to judge whether the acquired public key of the currently highest priority information matches with the hash value ciphertext and inform the authentication module to use the acquired public key information of the currently highest priority to authenticate the signature information, if the acquired public key of the currently highest priority information matches with the hash value ciphertext.

Figure 13:
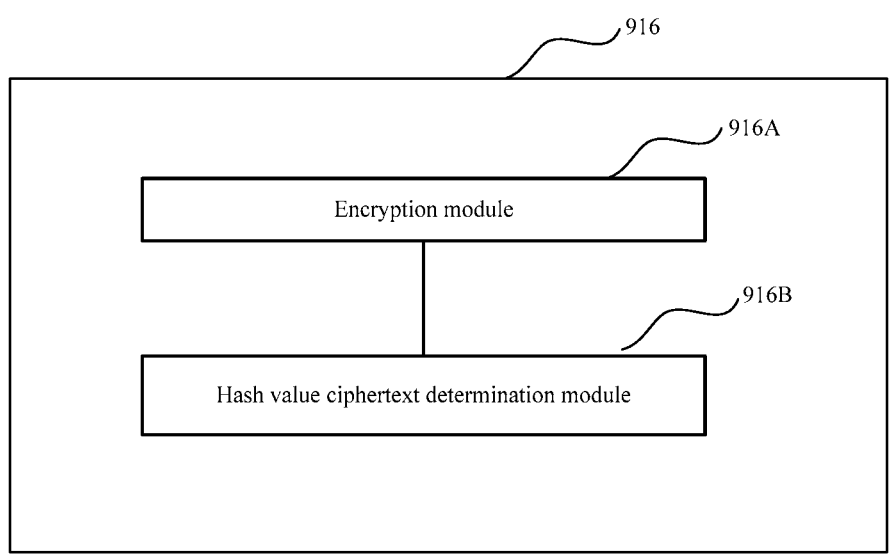
FIG. 13 depicts a block diagram of a determination module in one embodiment.

As shown in FIG. 13, in one embodiment, the determination module 916 includes:

an encryption module 916A configured to encrypt the acquired public key of the currently highest priority to generate a first hash value ciphertext;

a hash value ciphertext determination module 916B configured to determine whether the hash value ciphertext is consistent with the first hash value ciphertext corresponding to the public key information of the highest level, and determines that the public key information of the currently highest priority matches with the hash value ciphertext, if the hash value ciphertext is consistent with the first hash value ciphertext corresponding to the public key information of the highest level.

In one embodiment, computer equipment is provided, the computer equipment may be terminal and includes a memory, a processor, and a computer readable instruction store in the memory and executable on the processor, the processor is configured to execute the computer program to implement following steps of: acquiring an application file to be downloaded and extracting signature information in the application file; acquiring public key information contained in a multilevel key hierarchy and acquiring public key information of the currently highest priority according to a priority order of the public key information; authenticating the signature information with the acquired public key information of the currently highest priority; and allowing the application file to be downloaded if an authentication of the signature information is passed.

In one embodiment, the processor is further configured to perform following steps of: downloading at least one authenticated public key information into the multilevel key hierarchy; and performing a priority setting on the public key information in the multilevel key hierarchy according to a hierarchy level, where the higher the hierarchy is, the higher the priority is.

In one embodiment, a step of acquiring public key information contained in a multilevel key hierarchy and acquiring public key information of the currently highest priority according to a priority order of the public key information performed by the processor includes: acquiring the public key information contained in the multilevel key hierarchy, when multilevel public key information is included in the multilevel key hierarchy, root public key information is used to authenticate the legality of the first public key information in the first level; if an authentication of the first public key information in the first level is successful, the first public key information in the first level is used to authenticate the legality of the second public key information in the second level, and the like, until the current legitimate public key information with the highest priority is acquired.

In one embodiment, the processor is further configured to perform following steps of: receiving an instruction of deleting the public key information of the currently highest priority, where the instruction is generated by downloading public key information with the secondary priority, and the public key information with the secondary priority is signed by using private key information corresponding to the public key information of the currently highest priority; and deleting the public key information of the currently highest priority according to the instruction.

In one embodiment, the processor is further configured to perform following steps of: reading a hash value ciphertext corresponding to pre-stored public key information of the highest level; determining whether the acquired public key information of the currently highest priority matches with the hash value ciphertext corresponding to the pre-stored public key information of the highest level; and performing the step of authenticating the signature information with the acquired public key information of the currently highest priority, if the acquired public key information of the currently highest priority matches with the hash value ciphertext corresponding to the pre-stored public key information of the highest level.

In one embodiment, the step of determining whether the acquired public key information of the currently highest priority matches with the hash value ciphertext performed by the processor includes: encrypting a hash value of the acquired public key information of the currently highest priority to generate a first hash value ciphertext; determining whether the first hash value ciphertext is consistent with a hash value ciphertext corresponding to the public key information of the highest level; and determining that the public key information of the currently highest priority matches with the hash value ciphertext corresponding to the public key information of the highest level, if the first hash value ciphertext is consistent with the hash value ciphertext corresponding to the public key information of the highest level.

In one embodiment, one or a plurality of non-volatile computer readable storage medium storing a computer executable instruction are provided, where when the computer executable instruction is executed by one or a plurality of processors, the one or a plurality of processors are caused to perform following steps of: acquiring an application file to be downloaded and extracting signature information in the application file; acquiring public key information contained in a multilevel key hierarchy, and acquiring public key information of the currently highest priority according to a priority order of the public key information; authenticating the signature information with the acquired public key information of the currently highest priority; and allowing the application file to be downloaded if an authentication of the signature information is passed.

In one embodiment, the processor is further configured to perform following steps of: downloading at least one authenticated public key information into the multilevel key hierarchy; and performing a priority setting on the public key information in the multilevel key hierarchy according to a hierarchy level, where the higher the hierarchy is, the higher the priority is.

In one embodiment, a step of acquiring public key information contained in a multilevel key hierarchy, and acquiring public key information of the currently highest priority according to a priority order of the public key information performed by the processor includes: acquiring the public key information contained in the multilevel key hierarchy, when multilevel public key information is included in the multilevel key hierarchy, root public key information is used to authenticate the legality of the first public key information in the first level; if an authentication of the first public key information in the first level is successful, the first public key information in the first level is used to authenticate the legality of the second public key information in the second level, and the like, until the current legitimate public key information with the highest priority is acquired.

In one embodiment, the processor is further configured to perform following steps of: receiving an instruction of deleting the public key information of the currently highest priority, where the instruction is generated by downloading public key information with the secondary priority, and the public key information with the secondary priority is signed by using private key information corresponding to the public key information of the currently highest priority; and deleting the public key information of the currently highest priority according to the instruction.

In one embodiment, the processor is further configured to perform following steps of: reading a hash value ciphertext corresponding to pre-stored public key information of the highest level; determining whether the acquired public key information of the currently highest priority matches with the hash value ciphertext corresponding to the pre-stored public key information of the highest level; and performing the step of authenticating the signature information with the acquired public key information of the currently highest priority, if the acquired public key information of the currently highest priority matches with the hash value ciphertext corresponding to the pre-stored public key information of the highest level.

In one embodiment, the step of determining whether the acquired public key information of the currently highest priority matches with the hash value ciphertext performed by the processor includes: encrypting a hash value of the acquired public key information of the currently highest priority to generate a first hash value ciphertext; determining whether the first hash value ciphertext is consistent with a hash value ciphertext corresponding to the public key information of the highest level; and determining that the public key information of the currently highest priority matches with the hash value ciphertext corresponding to the public key information of the highest level, if the first hash value ciphertext is consistent with the hash value ciphertext corresponding to the public key information of the highest level.

The person of ordinary skilled in the art may be aware of that, a whole or a part of flow process of implementing the method in the aforesaid embodiments of the present disclosure may be accomplished by using computer program to instruct relevant hardware. When the computer program is executed, the steps in the various method embodiments described above may be included. Where, the storage medium may be ROM (Read-Only Memory), RAM (Random Access Memory), and so on.

The various technical features in the aforesaid embodiments may be combined arbitrarily, for describing conveniently, all possible combinations of the various technical features In this embodiments described above are not described, however, the combinations of these technical features should all be considered as falling within the protection scope of the description as long as the combinations of these technical features are not contradicted with each other.

Some implementation modes of the present disclosure are described in the aforesaid embodiments, the and the implementation modes are described specifically and in detail, and should not be interpreted as limitation to the patent protection scope of the present disclosure. It should be noted that, the person of ordinary skill in the art may also make some modifications and improvements without breaking away from the inventive concept of the present disclosure, and these modifications and improvements are all included in the protection scope of the present disclosure. Thus, the protection scope of the present disclosure should be determined by the attached claims.

What is claimed is:

1. An application security authentication method, comprising the steps of:
    acquiring an application file to be downloaded and extracting signature information from the application file;
    acquiring public key information contained in a multilevel key hierarchy, and acquiring public key information of the currently highest priority according to a priority order of the public key information;
    authenticating the signature information with the acquired public key information of the currently highest priority; and
    allowing the application file to be downloaded if an authentication of the signature information is passed;
    wherein before the step of acquiring the application file to be downloaded and extracting signature information in the application file, the method further comprises:
    downloading at least one authenticated public key information into the multilevel key hierarchy; and
    performing a priority setting on the public key information in the multilevel key hierarchy according to a hierarchy level, wherein the higher the hierarchy is, the higher the priority is.

2. The method according to claim 1, wherein the step of acquiring public key information contained in a multilevel key hierarchy and acquiring public key information of the currently highest priority according to a priority order of the public key information comprises:
    acquiring the public key information contained in the multilevel key hierarchy, wherein when multilevel public key information is included in the multilevel key hierarchy, root public key information is acquired as the current public key information, and the current public key information is used to authenticate the legality of the public key information of the up one level; if an authentication of the public key information of the up one level is successful, the successfully authenticated public key information of the up one level is used as the current public key information, and a step of authenticating the public key information of the up one level according to the current public key information is performed until the current legitimate public key information with the highest priority is acquired, wherein the higher the hierarchy is, the higher the priority is.

3. The method according to claim 1, further comprising:
    receiving an instruction of deleting the public key information of the currently highest priority, wherein the instruction is generated by downloading public key information with the secondary priority, and the public key information with the secondary priority is signed by using private key information corresponding to the public key information of the currently highest priority; and
    deleting the public key information of the currently highest priority according to the instruction.

4. The method according to claim 1, wherein before the step of authenticating the signature information with the acquired public key information of the currently highest priority, the method further comprises steps of:
    reading a hash value ciphertext corresponding to pre-stored public key information of the highest level;
    determining whether the acquired public key information of the currently highest priority matches with the hash value ciphertext corresponding to the pre-stored public key information of the highest level; and
    performing the step of authenticating the signature information with the acquired public key information of the currently highest priority, if the acquired public key information of the currently highest priority matches with the hash value ciphertext corresponding to the pre-stored public key information of the highest level.

5. The method according to claim 4, whether the step of determining whether the acquired public key information of the currently highest priority matches with the hash value ciphertext comprises:
  encrypting a hash value of the acquired public key information of the currently highest priority to generate a first hash value ciphertext;
  determining whether the first hash value ciphertext is consistent with a hash value ciphertext corresponding to the public key information of the highest level; and
  determining that the public key information of the currently highest priority matches with the hash value ciphertext corresponding to the public key information of the highest level, if the first hash value ciphertext is consistent with the hash value ciphertext corresponding to the public key information of the highest level.

6. A computer equipment, comprising a memory and a processor, and the memory is configured to store a computer readable instruction, wherein when the computer readable instruction is executed by the processor, the processor is configured to perform the following steps:
  acquiring an application file to be downloaded and extracting signature information in the application file;
  acquiring public key information contained in a multilevel key hierarchy and acquiring public key information of the currently highest priority according to a priority order of the public key information;
  authenticating the signature information with the acquired public key information of the currently highest priority; and
  allowing the application file to be downloaded if an authentication of the signature information is passed;
  wherein the processor is further configured to perform following steps of:
  downloading at least one authenticated public key information into the multilevel key hierarchy; and
  performing a priority setting on the public key information in the multilevel key hierarchy according to a hierarchy level, wherein the higher the hierarchy is, the higher the priority is.

7. The computer equipment according to claim 6, wherein the step of acquiring public key information contained in a multilevel key hierarchy and acquiring public key information of the currently highest priority according to a priority order of the public key information performed by the processor comprises:
  acquiring the public key information contained in the multilevel key hierarchy, wherein when multilevel public key information is included in the multilevel key hierarchy, root public key information is acquired as the current public key information, and the current public key information is used to authenticate the legality of the public key information of the up one level; if an authentication of the public key information of the up one level is successful, the successfully authenticated public key information of the up one level is used as the current public key information, and a step of authenticating the public key information of the up one level according to the current public key information is performed until the current legitimate public key information with the highest priority is acquired, wherein the higher the hierarchy is, the higher the priority is.

8. The computer equipment according to claim 6, wherein the processor is further configured to perform following steps of:
  receiving an instruction of deleting the public key information of the currently highest priority, wherein the instruction is generated by downloading public key information with the secondary priority, and the public key information with the secondary priority is signed by using private key information corresponding to the public key information of the currently highest priority; and
  deleting the public key information of the currently highest priority according to the instruction.

9. The computer equipment according to claim 6, wherein the processor is further configured to perform following steps of:
  reading a hash value ciphertext corresponding to pre-stored public key information of the highest level;
  determining whether the acquired public key information of the currently highest priority matches with the hash value ciphertext corresponding to the pre-stored public key information of the highest level; and
  performing the step of authenticating the signature information with the acquired public key information of the currently highest priority, if the acquired public key information of the currently highest priority matches with the hash value ciphertext corresponding to the pre-stored public key information of the highest level.

10. The computer equipment according to claim 9, wherein the step of determining whether the acquired public key information of the currently highest priority matches with the hash value ciphertext performed by the processor comprises:
  encrypting a hash value of the acquired public key information of the currently highest priority to generate a first hash value ciphertext;
  determining whether the first hash value ciphertext is consistent with a hash value ciphertext corresponding to the public key information of the highest level; and
  determining that the public key information of the currently highest priority matches with the hash value ciphertext corresponding to the public key information of the highest level, if the first hash value ciphertext is consistent with the hash value ciphertext corresponding to the public key information of the highest level.

11. One or a plurality of non-transitory non-volatile computer readable storage medium storing a computer executable instruction, wherein when the computer executable instruction is executed by one or a plurality of processors, the one or a plurality of processors are configured to perform following steps of:
  acquiring an application file to be downloaded and extracting signature information in the application file;
  acquiring public key information contained in a multilevel key hierarchy and acquiring public key information of the currently highest priority according to a priority order of the public key information;
  authenticating the signature information with the acquired public key information of the currently highest priority; and
  allowing the application file to be downloaded if an authentication of the signature information is passed;
  wherein the processor is further configured to perform following steps of:
  downloading at least one authenticated public key information into the multilevel key hierarchy; and performing a priority setting on the public key information in the multilevel key hierarchy according to a hierarchy level, wherein the higher the hierarchy is, the higher the priority is.

12. The non-transitory non-volatile computer readable storage medium according to claim 11, wherein the step of acquiring public key information contained in a multilevel key hierarchy and acquiring public key information of the currently highest priority according to a priority order of the public key information performed by the processor comprises:

acquiring the public key information contained in the multilevel key hierarchy, wherein when multilevel public key information is included in the multilevel key hierarchy, root public key information is acquired as the current public key information, and the current public key information is used to authenticate the legality of the public key information of the up one level; if an authentication of the public key information of the up one level is successful, the successfully authenticated public key information of the up one level is used as the current public key information, and a step of authenticating the public key information of the up one level according to the current public key information is performed until the current legitimate public key information with the highest priority is acquired, wherein the higher the hierarchy is, the higher the priority is.

13. The non-transitory non-volatile computer readable storage medium according to claim 11, wherein the processor is further configured to perform following steps of:

receiving an instruction of deleting the public key information of the currently highest priority, wherein the instruction is generated by downloading public key information with the secondary priority, and the public key information with the secondary priority is signed by using private key information corresponding to the public key information of the currently highest priority; and deleting the public key information of the currently highest priority according to the instruction.

14. The non-transitory non-volatile computer readable storage medium according to claim 11, wherein the processor is further configured to perform following steps of:

reading a hash value ciphertext corresponding to pre-stored public key information of the highest level;

determining whether the acquired public key information of the currently highest priority matches with the hash value ciphertext corresponding to the pre-stored public key information of the highest level; and performing the step of authenticating the signature information with the acquired public key information of the currently highest priority, if the acquired public key information of the currently highest priority matches with the hash value ciphertext corresponding to the pre-stored public key information of the highest level.

15. The non-transitory non-volatile computer readable storage medium according to claim 14, wherein the step of determining whether the acquired public key information of the currently highest priority matches with the hash value ciphertext performed by the processor comprises:

encrypting a hash value of the acquired public key information of the currently highest priority to generate a first hash value ciphertext;

determining whether the first hash value ciphertext is consistent with a hash value ciphertext corresponding to the public key information of the highest level; and determining that the public key information of the currently highest priority matches with the hash value ciphertext corresponding to the public key information of the highest level, if the first hash value ciphertext is consistent with the hash value ciphertext corresponding to the public key information of the highest level.

* * * * *